（12) United States Patent
Engelmann

(10) Patent No.: US 8,245,598 B2
(45) Date of Patent: Aug. 21, 2012

(54) DIFFERENTIAL CARRIER CONSISTING OF HALF-SHELLS AND A PROCESS OF PRODUCING A DIFFERENTIAL CARRIER

(75) Inventor: Michael Engelmann, St. Augustin (DE)

(73) Assignee: GKN Driveline International GmbH, Lohmar (DE)

( * ) Notice: Subject to any disclaimer, the term of this patent is extended or adjusted under 35 U.S.C. 154(b) by 62 days.

(21) Appl. No.: 12/864,634

(22) PCT Filed: Dec. 6, 2008

(86) PCT No.: PCT/EP2008/010362
§ 371 (c)(1),
(2), (4) Date: Jul. 26, 2010

(87) PCT Pub. No.: WO2009/095056
PCT Pub. Date: Aug. 6, 2009

(65) Prior Publication Data
US 2010/0323841 A1    Dec. 23, 2010

(30) Foreign Application Priority Data
Jan. 29, 2008    (DE) .......................... 10 2008 006 627

(51) Int. Cl.
*F16H 57/02* (2012.01)
*F16H 57/04* (2010.01)
*F16H 61/00* (2006.01)

(52) U.S. Cl. ..................................... 74/606 R; 475/220

(58) Field of Classification Search .................... 74/640, 74/665 GB, 606 R, 607; 475/220, 230, 248, 475/331
See application file for complete search history.

(56) References Cited

U.S. PATENT DOCUMENTS

| 3,365,984 | A |   | 1/1968  | Musgrave        |         |
|-----------|---|---|---------|-----------------|---------|
| 3,406,592 | A | * | 10/1968 | Von Kaler       | 475/230 |
| 3,768,336 | A |   | 10/1973 | Wharton         |         |
| 4,037,492 | A | * | 7/1977  | Ashauer et al.  | 475/160 |
| 4,183,263 | A |   | 1/1980  | Osenbaugh       |         |
| 4,221,138 | A |   | 9/1980  | Stewart et al.  |         |
| 4,930,367 | A |   | 6/1990  | Nagasawa        |         |
| 5,480,360 | A |   | 1/1996  | Patzer et al.   |         |
| 5,533,423 | A |   | 7/1996  | Stehle et al.   |         |

(Continued)

FOREIGN PATENT DOCUMENTS

DE    27 24 468 A1    1/1978

(Continued)

OTHER PUBLICATIONS

PCT International Search Report for PCT/EP2008/010362 dated Aug. 6, 2009.

*Primary Examiner* — Justin Holmes
(74) *Attorney, Agent, or Firm* — Rader, Fishman & Grauer, PLLC

(57) ABSTRACT

A differential carrier with an axis of rotation A around which the differential carrier can be rotatably supported in a differential housing is disclosed. The differential carrier comprises a first half-shell and a second half-shell. Each half-shell comprises a central carrier portion and two outer bearing portions. The two half-shells are connected to one another in the region of their bearing portions. A differential assembly which comprises such a differential carrier is also disclosed.

18 Claims, 6 Drawing Sheets

U.S. PATENT DOCUMENTS

| | | | |
|---|---|---|---|
| 5,791,205 A | 8/1998 | Ruppert, Jr. | |
| 7,780,565 B2 * | 8/2010 | Fusegi et al. | 475/230 |
| 2001/0053729 A1 * | 12/2001 | Janiszewski et al. | 475/230 |
| 2003/0060294 A1 * | 3/2003 | Ouchi | 464/178 |

FOREIGN PATENT DOCUMENTS

| | | |
|---|---|---|
| DE | 40 42 173 A1 | 7/1992 |
| GB | 1 461 023 A | 1/1977 |
| JP | 58-144141 A | 8/1983 |

* cited by examiner

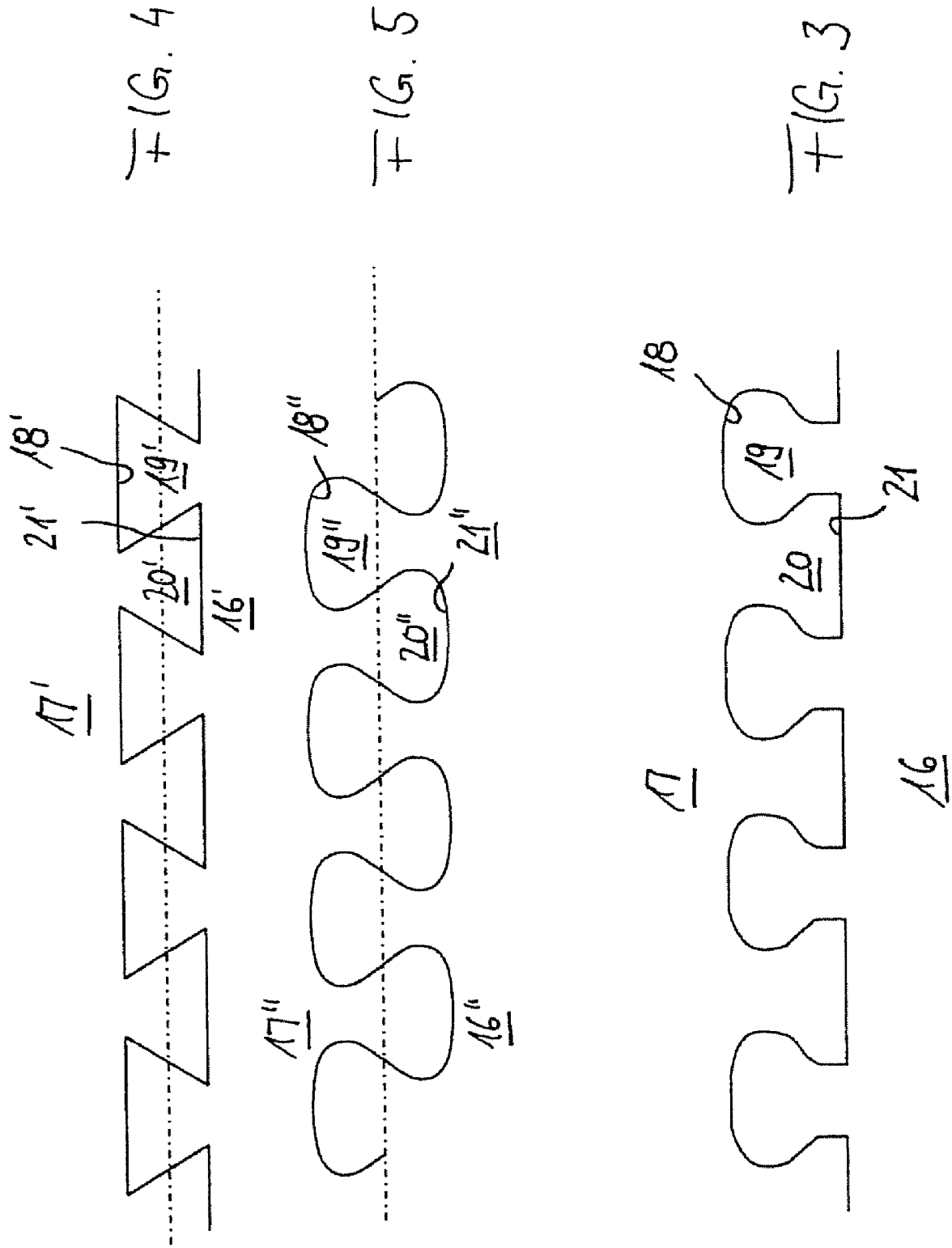

US 8,245,598 B2

DIFFERENTIAL CARRIER CONSISTING OF HALF-SHELLS AND A PROCESS OF PRODUCING A DIFFERENTIAL CARRIER

TECHNICAL FIELD

The disclosure relates to a differential carrier which is produced from a plurality of sheet metal parts, and to a process of producing such a differential carrier.

BACKGROUND

Differential carriers normally receive a set of differential gears and are rotatably supported in a stationary housing of a differential drive around an axis of rotation. Such a differential assembly serves to distribute torque from an input shaft to two output shafts, with a differential effect occurring between the output shafts. For example, such differential assemblies are used in the driveline of a motor vehicle for transmitting torque from a propeller shaft to two sideshafts. The set of differential gears accommodated in the differential carrier normally comprises a plurality of differential gears which are rotatably supported in the differential carrier and rotate jointly with same around the axis of rotation, as well as two sideshaft gears which are arranged opposite one another, which are rotatably supported on the axis of rotation and which engage the differential gears.

From DE 40 42 173 A1 there is known a differential assembly with a two-part differential carrier made of metal sheet. The two carrier parts includeoutwardly extending flanges which face one another and which, along their circumference, jointly are in contact with the driving gear. The two carrier parts are connected by means of a welded parallel joint to the driving gear which is arranged in the central plane.

GB 1 461 023 A discloses a differential assembly with a two-part differential carrier which includes a cup-shaped carrier part and a cover-shaped carrier part. The two carrier parts are welded together, with the joining plane being positioned eccentrically relative to the plane formed by the axes of rotation of the differential gears.

U.S. Pat. No. 4,183,263 describes a differential assembly which includes two identical half-housings. The two half-housings each comprise a central portion as well as a half-flange on one side of the central portion. The two half-housings are connected to one another by a crown wheel which, via bolts, is connected to the two half-flanges and by a securing ring which is slid over the two half-housings and engages an annular groove in the central portion.

BACKGROUND

A differential carrier is provided with an axis of rotation A for rotatably supporting same in a differential housing. The differential carrier comprises a first half-shell and a second half-shell, each of which comprises a central carrier portion and two outer bearing portions for rotatably supporting the differential carrier. The first and the second half-shell are connected to one another in the region of their bearing portions, wherein the two bearing portions serve to rotatably support the differential carrier around the axis of rotation A.

SUMMARY

One exemplary advantage of the inventive differential carrier includes that it can be produced easily and cost-effectively from two carrier parts. The two carrier parts are each produced in one piece and, more particularly, are shell-shaped. Producing the two half-shells from fainted sheet-metal parts is particularly advantageous from a production-technical point of view, for example by deep-drawing. Furthermore, from the point of view of cost-effectiveness in one exemplary arrangement, it is advantageous if the two half-shells are identical, with the joining and, respectively, separating plane of the two half-shells either extending parallel to the axis of rotation or containing same. The differential gears are held at least indirectly at opposed carrier portions, so that they rotate jointly with the differential carrier around the axis of rotation. For example, they are held by a journal which is connected to the carrier portions and on which the differential gears are rotatably supported.

In one exemplary configuration, the two half-shells are designed in such a way that, in the assembled condition, between the two opposed carrier portions assembly openings are formed through which the sideshaft gears and the differential gears can be inserted into the differential carrier. For this purpose, the half-shells, in the region of the carrier portions, are formed radially outwardly, with the circumferential extension of the carrier portions approximately corresponding to the circumferential extension of the bearing portions. The bearing portions of the half-shells are designed in such a way that, in the assembled condition, they form a first and a second bearing sleeve. The bearing sleeves preferably comprise a cylindrical outer face on to which it is possible to slide a bearing for rotatably supporting the differential carrier in a differential housing.

According to one exemplary arrangement, the first and the second half-shell are connected to one another by form-locking mechanism which can also be referred to as a latching mechanism. In one exemplary arrangement, the form-locking mechanism comprises recesses with undercuts which are able to engage correspondingly formed projections in the opposed half-shell. In a side view, the recesses and projections of each half-shell can comprise identical or different contours. For example, the profiles can have a meandering shape, or they can be swallow-tail-shaped or have mixed shapes. Providing the two half-shells with a form-locking mechanism is advantageous in that they can be connected to one another simply by a linear joining movement. In one exemplary arrangement, the separating plane is positioned in a plane which contains the axis of rotation of the differential carrier or extends at a short distance parallel thereto.

According to an exemplary embodiment, there are provided bushings which are inserted into the two bearing sleeves. In one arrangement, the bushings may be press-fit into the bearing sleeves. As a result of the pressed-in bushings, the differential carrier may be provided with a high degree of stability in the region of the bearing sleeves, which has an advantageous effect on the service life. Furthermore, the bushings serve as bearing means for the sideshafts which are connected to the sideshaft gears in a rotationally fixed way. In one exemplary arrangement, the bushings contain a sleeve portion which is inserted in the associated bearing sleeve, as well as a supporting portion which outwardly widens the sleeve portion and which is axially supported against the half-shells. To achieve a low degree of wear and a long service life respectively, it is advantageous if the bushings at least in some regions comprise a high degree of hardness, with for example surface-hardened metal sheet or sintered metal being suitable. To provide simple differentials which do not have to meet a high degree of production accuracy, it is possible, instead of the bushings, to use half-shells with a suitable type of surface treatment, for instance nitriding.

Furthermore, a differential assembly, more particularly for being used in the driveline of a motor vehicle is also disclosed. The differential assembly comprises an inventive differential carrier which can comprise one of the above-mentioned embodiments; a plurality of differential gears which are rotatably held in the differential carrier and jointly rotate therewith around the axis of rotation A; and two sideshaft gears which are arranged opposite one another in the differential carrier. The two sideshaft gears are rotatably held on the axis of rotation and engage the differential gears.

One exemplary advantage of the inventive differential assembly refers to the simple production and assembly methods which are made possible by the inventive differential carrier. In the assembled condition, the two half-shells, together, comprise one, respectively two assembly openings through which the sideshaft gears and the differential gears can be inserted. The inventive differential assembly requires only a small number of parts, which advantageously affects production. In one exemplary arrangement, the two half-shells preferably have one bore each which are positioned on a common axis. A journal on which the differential gears are rotatably supported is inserted into said bores and axially secured.

A process of producing an inventive differential carrier is also disclosed. The process includes the following process stages:
forming a first sheet-metal part into the first half-shell with a carrier portion and two outer bearing portions which are arranged coaxially relative to a first axis;
forming a second sheet-metal part into the second half-shell with a carrier portion and two outer bearing portions which are arranged coaxially relative to a second axis; and joining the first half-shell and the second half-shell in the region of the bearing portions.

Like the inventive differential carrier and the differential assembly, this process also has the advantages of permitting a simple production procedure. In one exemplary production procedure, in the sense of the concept of identical parts is achieved if the first and the second half-shell are identical. The sheet metal parts can be produced by being punched out of a coil to form a sheet bar. The two half-shells can be joined for example by welding, more particularly laser welding or they can be joined by inter-engaging form-locking mechanisms or by a combination of said two possibilities.

A further process stage prior to the forming operation may also be performed, the process stage including:
working a form-locking mechanism into the sheet metal parts with joining being achieved by laterally inserting the first and the second half-shell into one another, with the first and the second axes being aligned in parallel. The direction of joining extends transversely to the axes of the half-shells. After the sides of the half-shells have been laterally inserted into one another, the form-locking mechanism is subjected to pressure, as a result of which the form-locking mechanism is secured against being released unintentionally. On their insides, the bearing portions are supported by a mandrel, so that they cannot be plastically deformed.

According to yet another exemplary embodiment of the process, the bushings are inserted into the bearing sleeves, and, more particularly, press-fits are produced between the bushings and the bearing sleeves. The bushes increase the strength of the differential carrier in the region of the bearing means and provide stability.

BRIEF DESCRIPTION OF THE DRAWINGS

Exemplary embodiments will be described below with reference to the drawings wherein

FIG. 3 shows an exemplary arrangement of a form-locking mechanism of the half-shells according to FIG. 1 in the form of a detail in a side view.

FIG. 4 shows another exemplary arrangement of the form-locking mechanism for a differential carrier according to FIG. 1 in a first variant with a swallow-tail-shaped profile.

FIG. 5 shows another exemplary arrangement of the form-locking mechanism for a differential carrier according to FIG. 1 in a second variant with a meandering profile.

DETAILED DESCRIPTION

Figure 1:
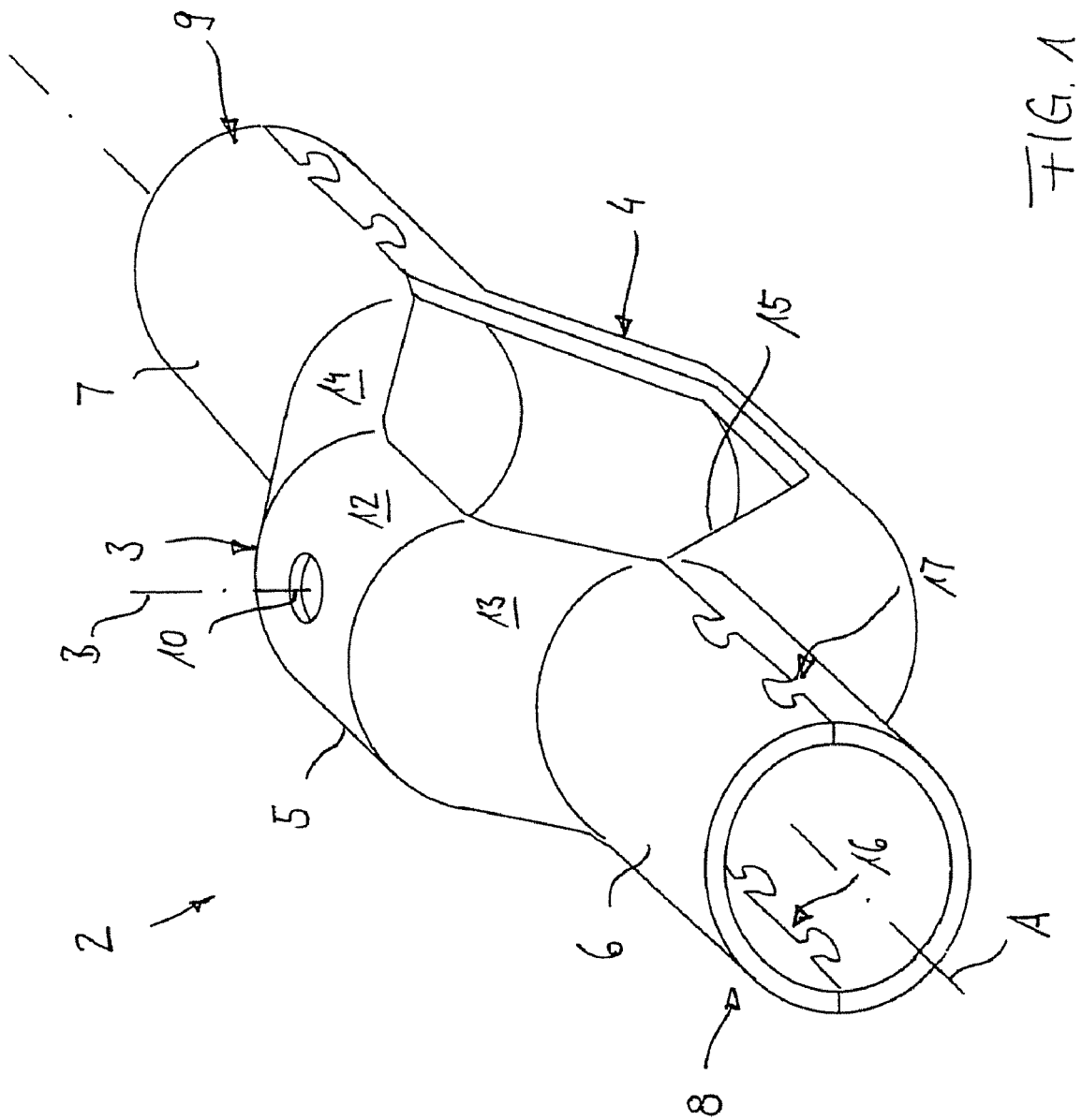
FIG. 1 shows an inventive differential carrier in a first embodiment in a perspective view.
Figure 2:
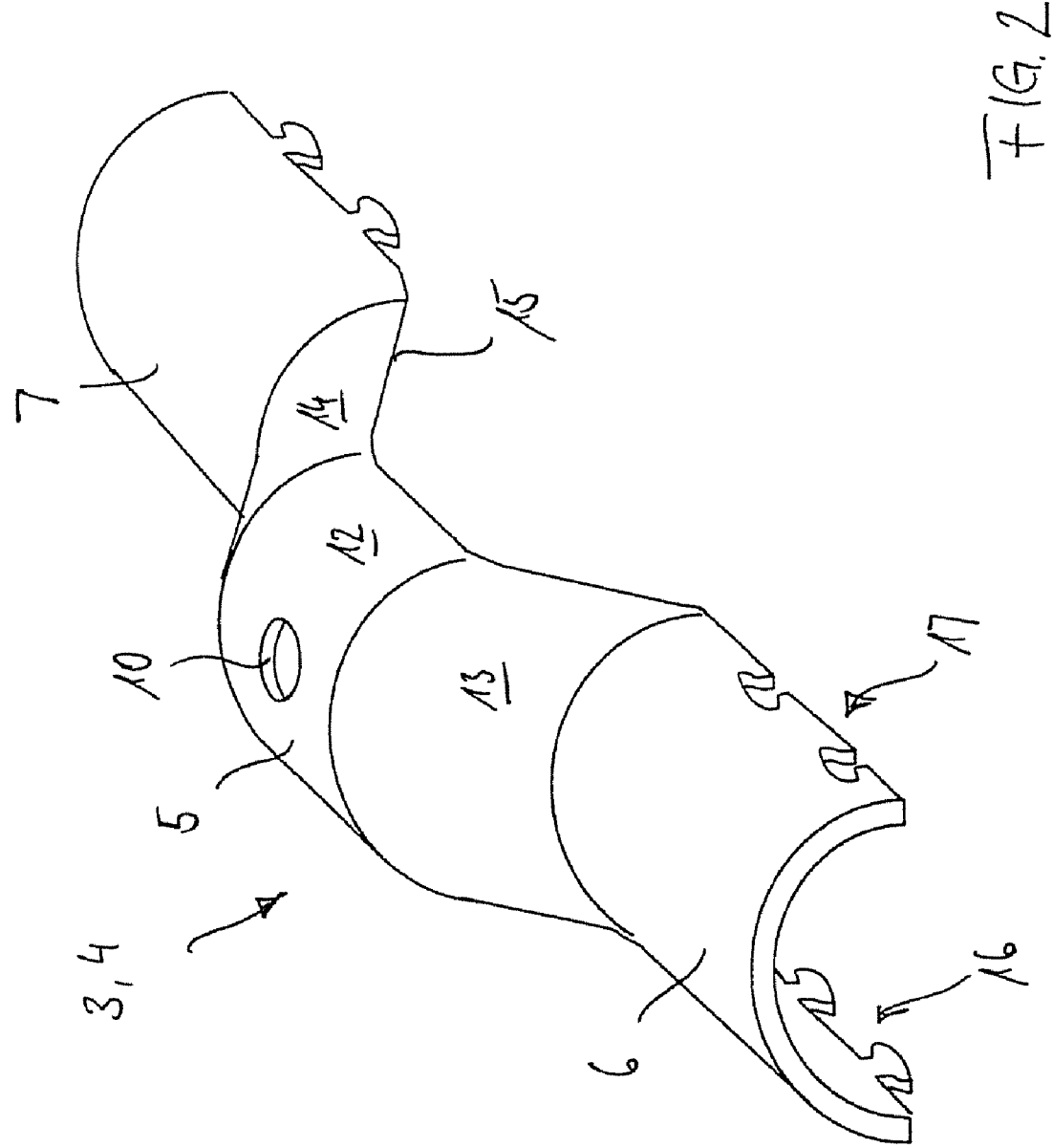
FIG. 2 shows a half-shell of the differential carrier according to FIG. 1 in a perspective view.

FIGS. 1 to 3 will be described jointly below. They show an exemplary arrangement of an inventive differential carrier 2 comprising a first half-shell 3 and a second half-shell 4 which are form-lockingly connected to one another.

With reference to a cross-sectional plane through the differential carrier 2, the first and the second half-shell 3, 4 are each substantially mirror-symmetric and each comprise a central carrier portion 5 and two outer bearing portions 6, 7. In the region of their bearing portions 6, 7, the two half-shells 3, 4 are connected to one another, with the bearing portions 6, 7, in the assembled condition, forming two bearing sleeves 8, 9. The bearing sleeves 8, 9 are cylindrical and serve to receive bearing means, for example in the of rolling contact bearings for the purpose of supporting the differential carrier 2 in the differential housing so as to be rotatable around the axis of rotation A.

The carrier portions 5 are approximately shell-shaped and, with reference to the axis of rotation A, they comprise an outer supporting portion 12 and two adjoining transition portions 13, 14 which approach the longitudinal axis A and which, on their radial insides, are connected to the bearing portions 6, 7. As a result of this design, the two half-shells 3, 4, in their assembled condition, form assembly openings 15 through which it is possible to mount the gears of a differential gear set (not illustrated). As a result of the shape of the half-shells 3, 4, respectively the carrier portions 5, the assembly openings 15 have an approximately hexagonal contour. In general, however, the carrier portions 5 can have any shape and, in respect of shape, they are adapted to the space required by the differential gear set. In the radially outer portion 12, the two half-shells 3, 4 each comprise a bore 10 which, in the assembled condition are positioned on a common axis B. The two opposed bores 10 serve to receive a journal (not illustrated) on which the differential gears are rotatably supported.

In the representative embodiment illustrated, the two half-shells 3, 4 are identical, which in respect of the concept of identical parts, is advantageous from the point of view of production. It can be seen that the first and the second half-shell 3, 4 are connected to one another by form-locking mechanism 16, 17. As is particularly obvious from FIG. 3, the form-locking mechanism 16, 17 comprises recesses 18, 21 with undercuts and projections 19, 20 with bulging portions. The recesses 18, 21 and the projections 19, 20 are designed so as to complement each other, so that they are able to engage one another in a form-locking way. To ensure a safe connection, it is advantageous if there is provided a plurality of form-locking mechanisms 16, 17 which extend along the length of the bearing portions 6, 7, with the recesses 18, 21 and the projections 19, 20, more particularly, alternating along the length. In the present representative embodiment according to FIGS. 1 to 3, the form-locking mechanism, in a side view, comprise an asymmetrical profile, i.e. the recesses 18, 21 and the projections 19, 20 differ from one another.

With reference to FIGS. 4 and 5 it can be seen quite clearly that different embodiments of the form-locking mechanism are also conceivable. In the embodiment according to FIG. 4, the form-locking mechanism 16', 17' is designed in such a way that it comprises a swallow-tail-like profile, with the recesses 18', 21' and the projections 19', 20' arranged therebetween comprising identical contours. In the embodiment according to FIG. 5, the form-locking mechanism 16", 17" comprises meandering profiles. In this case, too, the contours of the recesses 18", 21" and of the projections 19", 20" are identical.

Below, there will follow a description of the production of the inventive differential carrier 2. In one exemplary arrangement, the starting material for the two half-shells 3, 4 is preferably sheet metal bars which, initially, are punched into the required size. The contour of the sheet metal bar material as the starting material is adapted to the required shape of the half-shells. To that extent, the sheet metal bar material can have any shape, with approximately rectangular material being used in the present case. The contours of the form-locking mechanism 16, 17 and the bore 10 for receiving the journal are already worked into the sheet metal bar material during the punching operation. Subsequently, the sheet bar material is formed into the half-shells 3, 4 with their bearing portions 6, 7 and the intermediate carrier portions 5.

Then two half-shells 3, 4 formed in this way are connected to one another in the region of the bearing portions 6, 7, which is achieved by sliding into one another the first and the second half-shell 3, 4, with the first and second shell axes extending parallel relative to one another. In this way, the form-locking mechanism 16, 17 of one half-shell 3, 4 engages the form-locking mechanism 17, 16 of the other half-shell 4, 3, so that, in the joined condition, they are able to accommodate tangentially acting forces. Such forces occur while the differential is transmitting torque and they load the two half-shells in opposite directions radially away from the longitudinal axis A. So that the half-shells 3, 4 can be inserted into one another with their form-locking mechanism 16, 17, it is advantageous to provide a fit with a small amount of play. After having been inserted into one another, the form-locking mechanism 16, 17 is subjected to pressure, wherein the bearing portions 6, 7, on their insides, are supported by a mandrel in order to avoid plastic deformation. By subjecting the form-locking mechanism to pressure, it are safeguarded against unintentionally being released.

Figure 6:
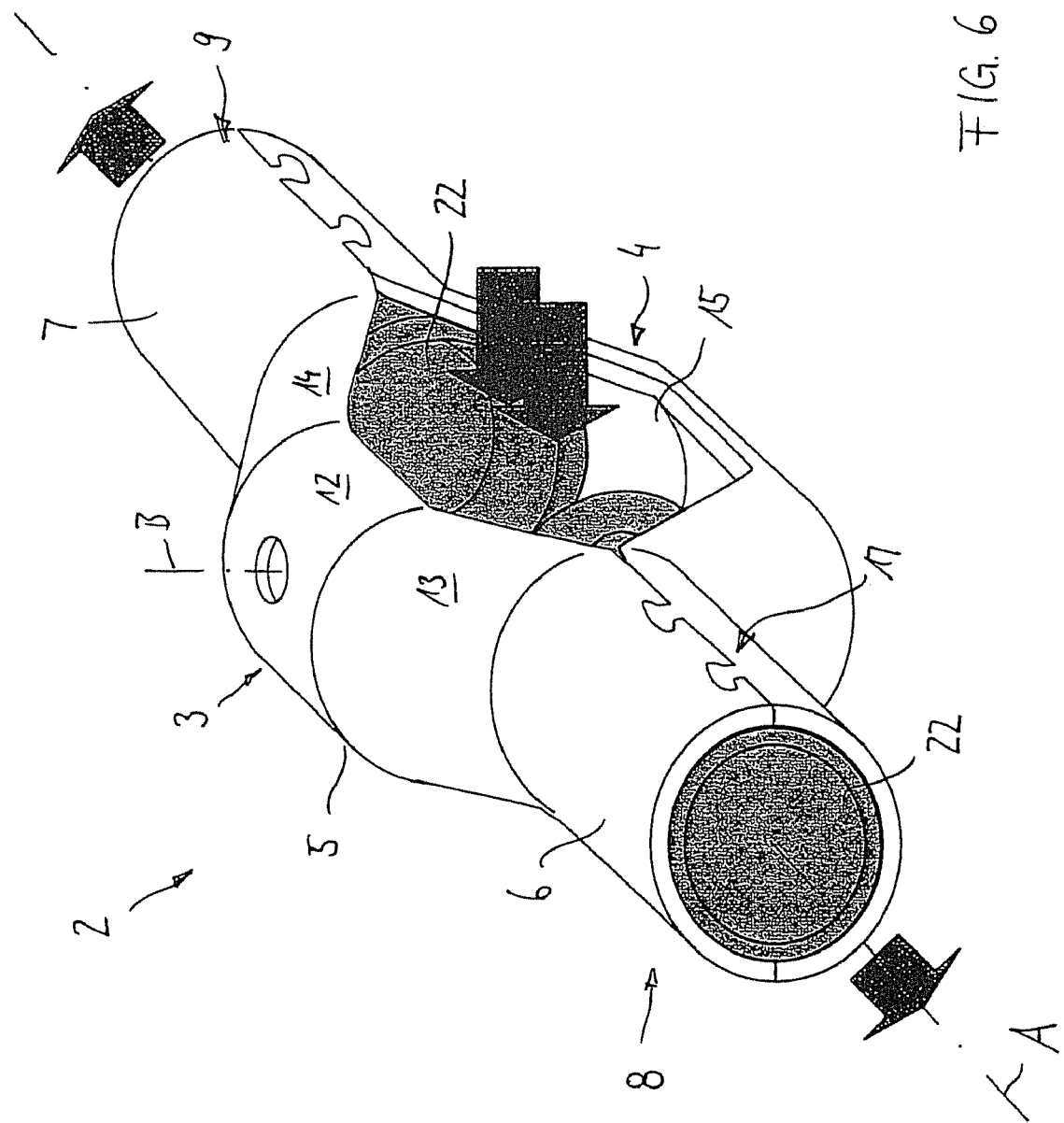
FIG. 6 shows an inventive differential carrier in a second embodiment with bushings in a perspective view.
Figure 7:
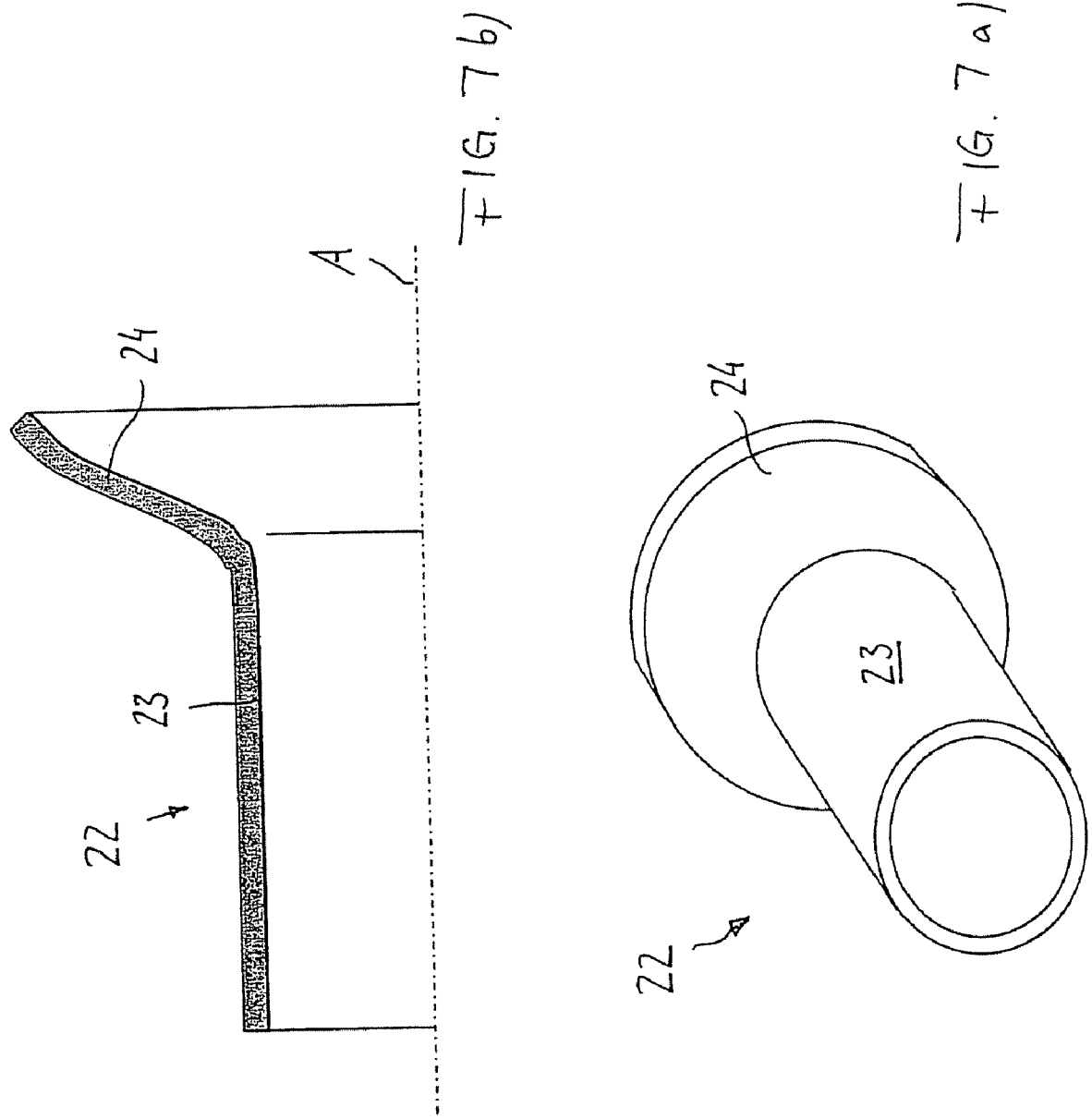
FIG. 7 shows one of the bushings according to FIG. 3:
a) in a perspective view; and
b) in half a longitudinal section.

FIG. 6 shows an inventive differential carrier in a second embodiment which largely corresponds to those shown in FIGS. 1 to 3. To that extent, reference can be made to the entire description thereof, with identical components having been given the same reference numbers. Below, there will therefore follow a description of the special features of the present exemplary embodiment only. To further develop the present exemplary embodiment, there are provided two bushings 22 which, after the half-shells 3, 4 have been joined, are inserted from the inside into the bearing sleeves 8, 9. The bushings 22, which in the form of details are shown in FIG. 7 comprise an excess dimension relative to the bearing sleeves 8, 9, so that they are fixed in the bearing sleeves 8, 9 by press fits. The bushings 22 each comprise a sleeve portion 23 which is positioned coaxially relative to the axis of rotation A in the associated bearing sleeve 8, 9; the bushings 22 also comprise a supporting portion 24 which is axially supported against the associated transition portions 13, 14 of the half-shells 3, 4. As a result of the bushings 22, the differential 2 is provided with a greater degree of stability in the region of the bearing sleeves 8, 9. Furthermore, the bushings 22 serve as bearing means for the sideshafts which are connected to the sideshaft gears (not illustrated) in a rotationally fixed way. In one exemplary arrangement, the bushings 22 are preferably hardened at least in some regions, which has an advantageous effect on service life.

Figure 8:
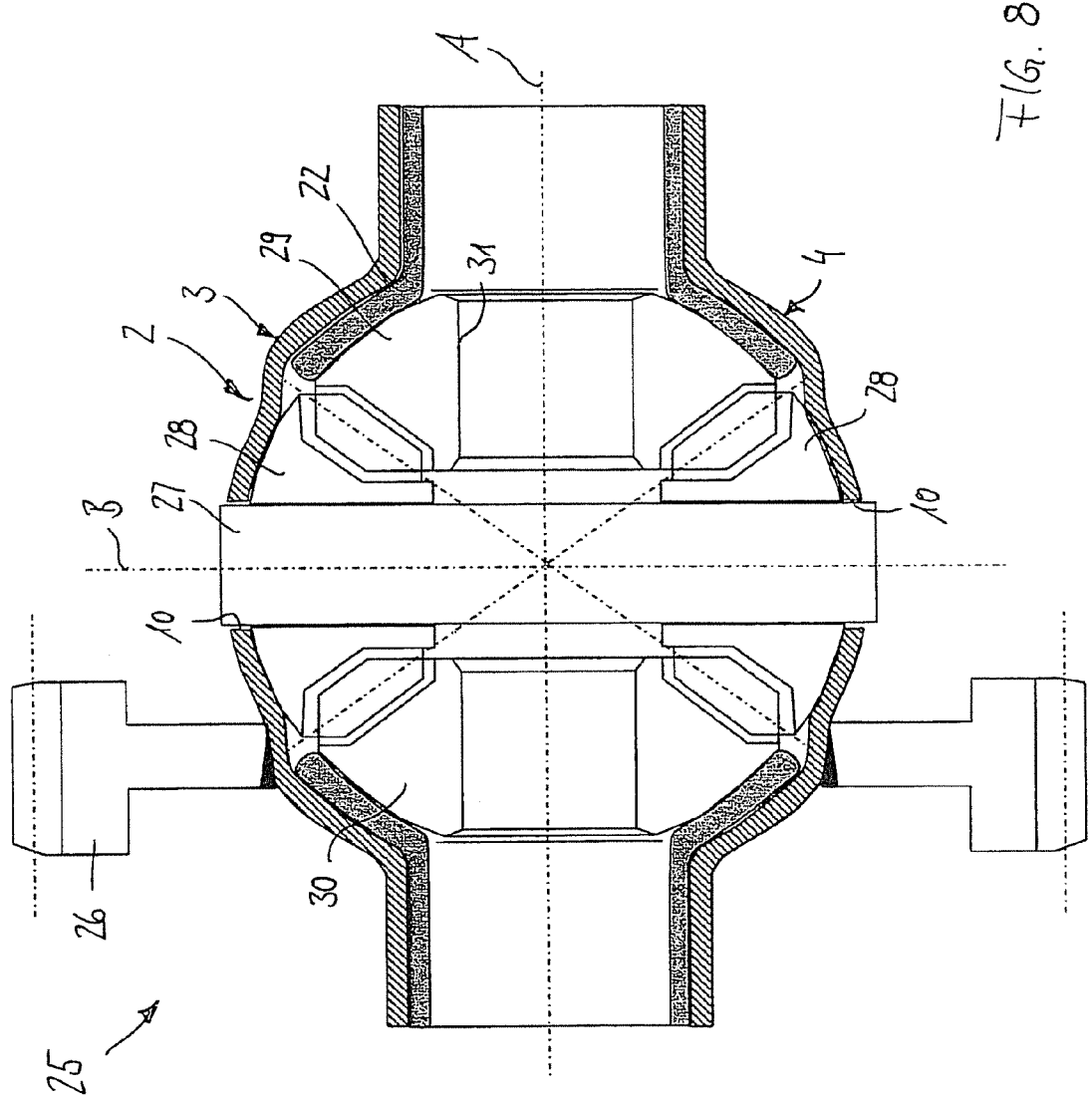
FIG. 8 shows an inventive differential assembly with a differential carrier according to FIG. 3 in a longitudinal section.

FIG. 8 shows an exemplary differential assembly with an inventive differential carrier 2 according to FIG. 6. To that extent, as far as the differential carrier is concerned, reference can be made to the above description in its entirety. The differential assembly 25 is held by a fixed differential housing (not illustrated) so as to be rotatable around the axis of rotation A and serves to transmit torque from a driveshaft (not illustrated) in the driveline of a motor vehicle to two sideshafts which have a differential effect relative to each other. To permit the introduction of torque, a driving gear 26 is fixed to the differential carrier 2. In one exemplary arrangement, the driving gear 26 is fixed to the differential carrier 2 by welding. The driving gear 26 is provided in the form of an annular gear which is driven by a driving pinion (not illustrated).

Furthermore, the differential assembly comprises a journal 27 which is inserted into the two bores 10 arranged opposite one another and connected to the differential carrier 2 by conventional connecting methods. Two differential gears 28 are rotatably supported on the journal 10 on the journal axis B. During the transmission of torque, the differential gears 28 rotate jointly with the differential carrier 2 around the axis of rotation A and thus drive the sideshaft gears 29, 30 which, while being arranged coaxially relative to the axis of rotation A, are rotatably supported in the differential carrier 2. It can be seen that the differential is provided in the form of a bevel gear differential, i.e. the differential gears 28 and the sideshaft gears 29, 30 engaging the latter are provided in the form of bevel gears. The sideshaft gears 29, 30 are each axially supported against the associated bushing 22, so that the spreading forces occurring during the transmission of torque are accommodated by the differential carrier 2. The sideshaft gears 29, 30 each comprise a central bore 31 with inner teeth into which it is possible to insert a sideshaft (not illustrated) in a rotationally fixed way for torque transmitting purposes.

An advantage of the inventive differential assembly 25 may be found in the simply designed differential carrier 2 which can be produced cost-effectively out of two half-shells 3, 4 produced out of formed sheet metal parts. First, the sideshaft gears 29, 30 are inserted into the pre-assembled differential carrier 2 through the assembly openings 15 and, while aligned coaxially on the axis of rotation A, are brought into contact with the differential carrier 2. The subsequent step consists in mounting the differential gears 28 which are brought into engagement with the sideshaft gears 29, 30. Thereafter, the journal 27 is inserted into the bores 10, which journal 27 carries the two differential gears 28, and is fixed relative to the differential carrier 2. Overall, the production of the differential assembly 25 is easy and cost-effective because there is no need for the carrier part to be additionally machined prior to the joining operation.

What is claimed is:

1. A differential carrier with an axis of rotation, comprising:
   a first half-shell and a second half-shell which are formingly produced from sheet metal, each comprising a central carrier portion and two outer bearing portions,
   wherein the first and the second half-shells are directly connected to one another in a region of their bearing portions, wherein the two bearing portions serve to rotatably support the differential carrier around an axis of rotation,
   wherein the first and second half-shells are connected to one another by a form-locking mechanism arranged in the region of the two bearing portions of the first and second half-shell, respectively,
   wherein the form-locking mechanism is configured such that, in an arranged condition, first portions of the first half-shell inter-engage with portions of the second half-shell are connected to each other in an axial and circumferential direction.

2. A differential carrier according to claim 1, wherein the first and the second half-shells are connected to one another in a joining plane, wherein the joining plane contains the axis of rotation or extends parallel to the axis of rotation.

3. A differential carrier according to claim 1, wherein the first half-shell and the second half-shell are identical.

4. A differential carrier according to claim 1, wherein the form-locking mechanism comprises recesses with under cut portions and complementary projections with bulging portions which engage the recesses such that in a mounted condition, the bulging portions of the projections engage behind the undercut portion of the recesses.

5. A differential carrier according to claim 4, wherein contours of the recesses and of the projections of each half-shell differ from one another.

6. A differential carrier according to claim 4, wherein contours of the recesses and of the projections of each half-shell are identical in shape.

7. A differential carrier according to claim 1, wherein, in a connected condition, the carrier portions form two assembly apertures for inserting sideshaft gears and differential gears.

8. A differential carrier according to claim 1, wherein, in a connected condition, the bearing portions form a first and a second bearing sleeve each configured for receiving a bearing.

9. A differential carrier according to claim 8, wherein there is provided a first bushing which is inserted into the first bearing sleeve, as well as a second bushing which is inserted into the second bearing sleeve.

10. A differential carrier according to claim 9, wherein between the bushings and the bearing sleeves, there are formed press-fits.

11. A differential carrier according to claim 9, the two bushings each comprise a sleeve portion which is positioned in the associated bearing sleeve, and a supporting portion which is axially supported against the half-shells.

12. A differential carrier according to claim 9, wherein at least partial portions of the bushings are hardened.

13. A differential assembly comprising
   a differential carrier according to claims 1;
   a plurality of differential gears which are rotatably held in the differential carrier and rotate jointly with the differential carrier around the axis of rotation;
   two sideshaft gears which are arranged opposite one another in the differential carrier, which are rotatably held on the axis of rotation and which engage the differential gears.

14. A differential assembly according to claim 13, wherein the first half-shell and the second half-shell each comprise a bore, which bores are positioned on a common axis, wherein a journal is held in the bores and rotatably supports the differential gears.

15. A process of producing a differential carrier, comprising the following process stages:
   forming a first sheet-metal part into a first half-shell with a first carrier portion and two first outer bearing portions which are arranged coaxially relative to a first axis;
   forming a second sheet-metal part into a second half-shell with a second carrier portion and two second outer bearing portions which are arranged coaxially relative to a second axis;
   working a form-locking mechanism component into each of the first and second sheet-metal parts; wherein, the form-locking mechanism component of the first sheet-metal part comprises recesses with undercut portions and wherein the form-locking mechanism component of the second sheet-metal part comprises projections complementary to the undercut portions, wherein the projections include bulging portions;
   joining the first half-shell and the second half-shell in the region of the bearing portions, wherein the first and the second half-shell are directly connected to one another, joining takes place by laterally inserting the first and second half-shells into one another, with the first and second axis being aligned so as to extend parallel to one another, so that the form-locking mechanism components of the first and second sheet-metal parts operatively engage one another such that the bulging portions of the projections engage behind the undercut portions of the recesses.

16. A process according to claim 15, wherein the following further process stage is provided after the parts have been laterally inserted into one another:
   pressing the form-locking mechanism, wherein the bearing portions, on their insides, are supported by a mandrel.

17. A process according to claim 15, wherein the following further process stage is provided after the parts have been laterally inserted into one another:
   inserting a first bushing into a first bearing sleeve; and
   inserting a second bushing into a second bearing sleeve.

18. A process of producing a differential carrier, comprising the following process stages:
   forming a first sheet-metal part into a first half-shell with a first carrier portion and two first outer bearing portions which are arranged coaxially relative to a first axis;
   forming a second sheet-metal part into a second half-shell with a second carrier portion and two second outer bearing portions which are arranged coaxially relative to a second axis;
   working a form-locking mechanism into the sheet-metal parts;
   joining the first half-shell and the second half-shell in the region of the bearing portions by laterally inserting the first and the second half-shell into one another, with the first and the second axis being aligned so as to extend parallel to one another, so that the form-locking mechanisms is operatively engaged and the first and the second half-shell are directly connected to one another;
   wherein the further process stage is provided after the parts have been laterally inserted into one another:
   pressing the form-locking mechanism, wherein the bearing portions, on their insides, are supported by a mandrel.

* * * * *